R. P. BROWN AND F. WAGNER.
RECORDING GAGE.
APPLICATION FILED DEC. 18, 1919.
1,390,273. Patented Sept. 13, 1921.
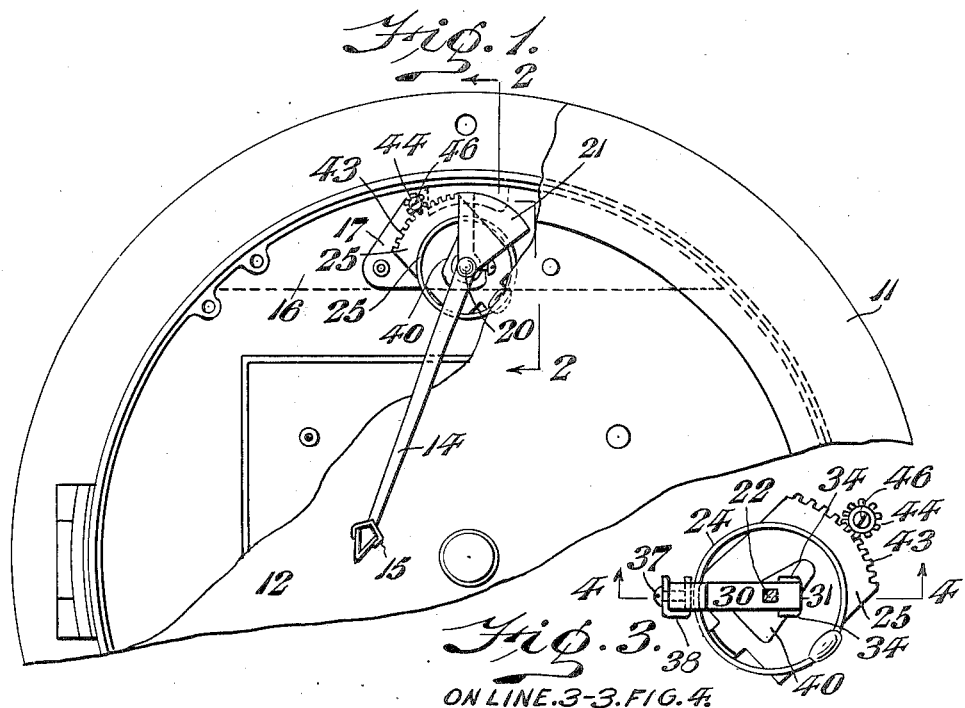
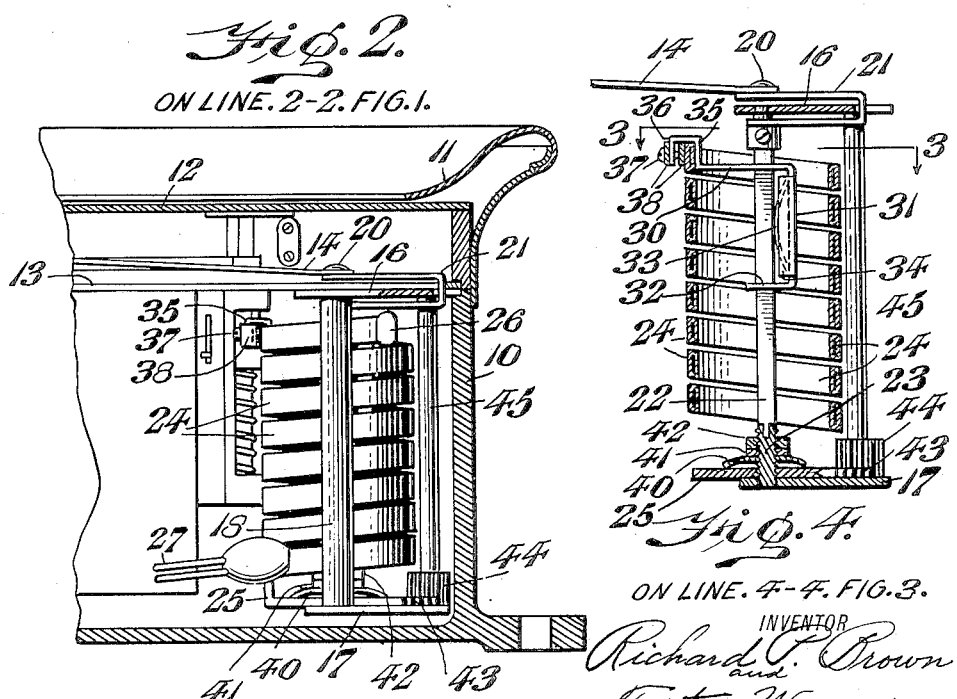

UNITED STATES PATENT OFFICE.

RICHARD P. BROWN AND FRITZ WAGNER, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

RECORDING-GAGE.

1,390,273.  Specification of Letters Patent.  Patented Sept. 13, 1921.

Application filed December 18, 1919. Serial No. 345,807.

*To all whom it may concern:*

Be it known that we, RICHARD P. BROWN and FRITZ WAGNER, citizens of the United States, and residents of Philadelphia, county of Philadelphia, State of Pennsylvania, have invented certain new and useful Improvements in Recording-Gages, of which the following is a specification.

Some of the objects of the present invention are to provide an improved construction in recording instruments such as thermometers, pressure gages, vacuum gages, and any other instruments of the recording type wherein a marking element is employed for indicating or recording purposes; to provide means for correcting or setting the pen or other indicating or recording element of such an instrument; to provide means for setting the pen or working element without touching or otherwise disturbing that element; to provide means for attaching the pen arm staff to the helix or other pen arm controlling means in an adjustable manner; to provide means for attaching the pen arm staff to the operating helix without soldering or otherwise permanently securing the parts; to provide the pen arm staff with axially movable means for attaching the staff to the operating helical tube; and to provide other improvements as will hereinafter appear.

In the accompanying drawings, Figure 1 represents a fragmentary front elevation, partly broken away of a recording gage showing one form of the present invention in pen arm adjusting means; Fig. 2 represents a section on line 2—2 of Fig. 1; Fig. 3 represents a section on line 3—3 of Fig. 4; and Fig. 4 represents a section on line 4—4 of Fig. 3.

Referring to the drawing one form of the present invention is shown mounted within a recording instrument of any suitable type comprising a casing 10, an apertured cover 11 and a transparent face 12. Visibly mounted beneath the face 12 is a suitably graduated scale or chart 13 arranged to be rotated, in the usual manner of such instruments, in order to graphically represent periods of time, and in conjunction with which an arm 14 is employed carrying a pen 15 or any other marking device to record on the scale or chart 13 vacuum, temperature or pressure conditions existing at any instant or during any period of time.

In the preferred form of construction the pen arm 14 and other adjuncts of the present invention are mounted as a unit in a frame comprising two plates 16 and 17 rigidly held in spaced relation by rods 18 of any suitable kind. This frame with its contained parts is arranged to be removably secured to the casing 10 by any well known fastening means and in its fixed operative position locates the pen arm 14 in proper relation to the chart 13 upon which the record is to be made. By this construction the adjuncts of the pen arm 14 are removably connected to the instrument case 10 and may be removed as a unit for inspection, repair or replacement as desired.

For mounting the pen arm 14 in a manner to move relative to the chart 13 it is fixedly secured at 20 to one leg of a substantially U-shaped holder 21, the other leg of which is rigidly connected to a movable staff 22 which forms the axis of rotation for the pen arm 14. The holder 21 is arranged to straddle the plate 16 and has sufficient clearance above the plate 16 to permit the chart 13 to assume its correct position. In connection with this construction it should be noted that the point of connection 20 between the pen arm 14 and the holder 21 is in exact alinement with the axis of rotation in order to accurately transmit the required motion to the pen arm 14 for correct records upon the chart 13. The staff 22 is preferably rectangular in cross-section, for a purpose presently to be described, and has one end journaled in the plate 16 and its opposite end journaled in a pin bearing 23 fast to the plate 17 whereby the staff 22 is freely rotatable and is sensitive to transmitted angular movement.

For causing the staff 22 to turn in one direction or the other, according to requirements, a helically coiled tube 24 is wound about the staff 22 as an axis and has one end fixed in any suitable manner to a normally fixed supporting disk 25 while its opposite end is free to move and transmit that movement to the staff 22 as will be explained. It will be understood that the free end of the tube 24 is sealed as shown at 26 while the other end thereof is connected to and in communication with a capillary tube or tubes 27 for carrying the gas or fluid medium to the helical tube 24 whereby it is influenced by pressure changes in the medium under consideration.

In order to adjust the action of the tube 24 upon the staff 22 a connecting link 30 is employed, extending radially from the staff 22 and having a body portion 31, bent to parallel the staff 22, and integral with which is a lateral extension 32 extending in the same direction as the link 30. Both the link 30 and extension 32 are apertured to receive the staff 22 and the construction is such that the body portion 31 is free to move relative to the staff 22 in an axial direction but angular movement of the body portion 31 causes the staff 22 to move likewise and thus correspondingly shift the pen arm 14. A flat spring 33 is preferably inserted between the staff 22 and the body portion 31, being there held in fixed condition so that any wear is automatically taken up and the parts are held firmly. This spring 33 is prevented from becoming displaced by providing the body portion 31 with inwardly disposed side flanges 34 whereby a simple and effective retaining cage is formed.

For purposes of adjustment the link 30 has its outer end bent in substantially U-shape to provide a relatively flat part 35 arranged to seat against the inner face of one of the coils of the tube 24 and a second part 36 overlapping the outer face of the same coil. Thus the link 30 and its parts are supported upon the top edge of one of the tube coils 24 and may be fixed at any desired part of the coil by means of a set screw 37 passing through one of the end parts of the link 30 and engaging a suitable clamping member 38 to thereby secure the parts together. It will be understood, however, that any suitable fastening means may be employed to hold the link 30 to the tube coil 24 in an adjustable manner.

In order to provide for adjusting the pen arm 14, the disk 25 is pivoted upon the bearing pin 23, being normally held against movement by a clip 40, the tension of which may be adjusted by a nut 41 and a lock nut 42, both of which are threaded upon the pin bearing member 23. The outer periphery of the disk 25 is in the form of a gear segment 43 which is in mesh with a pinion 44 fast upon a spindle 45 and having bearings at its ends respectively in the frame plates 16 and 17. One end of this spindle extends through the frame so that it is readily accessible when the case cover 11 is open and is provided with means, such as a slot 46, for causing the spindle 45 to be turned by employing a suitable coöperating tool. Any other means for causing the spindle 45 to be manually adjusted may be employed and it will be understood that the slot construction is only shown by way of example.

From the foregoing it will be apparent in assembled condition of the parts, that, should it be necessary to set the pen arm 14 to bring the pen 15 to a zero position or any other position with respect to the chart 13, the adjustment may be quickly and accurately made by engaging the projecting end of the spindle 45 with a screw-driver or other tool and turning it until the pen arm 14 assumes the required position. This is accomplished without touching the pen arm 14, which is therefore in no danger of becoming bent, distorted or otherwise damaged, since the motion of the spindle 45 is transmitted through the pinion 44, disk segment 43 to the helical tube 24 and thence to the staff 22 which carries the pen arm 14.

It will also be apparent that the helix tube 24 is free to expand and contract during operating conditions independent of any movement of the disk 25, which normally remains fixed, and this movement causes the staff 22 to be turned so that the pen arm 14 moves in a predetermined arc to record correct readings of pressure or temperature as the case may be. By releasing the set screw 37 the link 30 is free to be moved in either direction along the top coil of the tube 24 in order to vary the angular turning movement of the staff 22 as affected by the expansion, or contraction of the tube 24 and as this adjustment is made the body 31, which carries the link 30, automatically assumes a new position upon the staff 22 by sliding axially thereof. It will thus be evident that an adjustment of this character may be made simply by releasing a single clamping element which is located in an accessible position, and it is therefore unnecessary to handle associated parts, the adjustment of which might thereby be disturbed.

In case it is desired to remove the pen arm 14 and its adjuncts for purposes of repair or otherwise, the frame carrying this unit can be quickly taken out of the case 10 and replaced without disassembling the entire instrument.

It will further be noted that in this type of instrument the cover 11 is locked to the case 10 when the device is in operation and consequently, since the adjustable end of the spindle 45 is within the case, it cannot be tampered with by workmen or others, or the pen arm adjustment improperly changed.

Although only one of the many forms in which this invention may be embodied has been shown herein, it is to be understood that the invention is not limited to any specific construction but might be applied in various forms without departing from the spirit of the invention or the scope of the appended claims.

Having thus described our invention, we claim and desire to protect by Letters Patent of the United States:

1. In an instrument of the character stated, the combination of a movable element having a part arranged in operative relation to a scale or chart, a rotatable staff for supporting and turning said movable element, a pressure responsive device and means rotatable with and slidable axially of said staff for varying the working length of said responsive device for purposes of calibration.

2. In an instrument of the character stated, the combination of a pen arm, a pressure responsive device arranged to move said pen arm, and means for transmitting movement of said responsive device to said pen arm, said means including a part adjustable lengthwise of said responsive device, whereby the working length of said responsive device is varied for purposes of calibration.

3. In an instrument of the character stated, the combination of a pen arm, a rotatably mounted staff for supporting and moving said arm, a coiled pressure responsive device encircling said staff, and means including a part axially movable on said staff for adjustably connecting said responsive means to said staff.

4. In an instrument of the character stated, the combination of a pen arm, a rotatably mounted staff for supporting and moving said arm, a coiled pressure responsive device encircling said staff, and a member interposed between said responsive device and said staff, said member being arranged to transmit turning movement to said staff and being freely movable axially with respect to said staff.

5. In an instrument of the character stated, the combination of a pen arm, a rotatably mounted staff for supporting and moving said arm, a coiled pressure responsive device encircling said staff, a member arranged to transmit turning movement to said staff and being freely movable axially with respect to said staff, and means to adjustably connect said member to said responsive device.

6. In an instrument of the character stated, the combination of a pen arm, a rotatably mounted staff for supporting and moving said arm, a coiled pressure responsive device encircling said staff, a member arranged to transmit the rotary movement of said pressure responsive device to said staff, said member being freely movable axially with respect to said staff, means to adjustably connect said member to said responsive device, and a spring interposed between said member and said staff.

7. In an instrument of the character stated, the combination of a pen arm, a rotatably mounted staff arranged to actuate said arm, a pressure responsive device encircling said staff, a member adjustably mounted on said responsive device, and means connecting said member and said staff, said means being arranged to allow relative axial movement between said member and said staff and to transmit rotary movement of said responsive device to said staff.

8. In an instrument of the character stated, the combination of a pen arm, a rotatably mounted staff arranged to actuate said pen arm, said staff having a polygonal portion, a pressure responsive device operatively arranged with respect to said staff, and a member connected to said responsive device having a polygonal opening fitting said polygonal portion of said staff, whereby said member is arranged to slide axially of said staff and also to transmit rotary motion from said device to said staff.

9. In an instrument of the character stated, the combination of a casing, a scale or chart within said casing, a cover for said casing having a transparent portion through which said scale or chart is visible, a movable element having a part arranged in operative relation with said scale or chart, a rotatably mounted staff connected to said movable element, a disk pivotally mounted co-axially with respect to said staff and movable independently of said staff, said disk having a gear segment, a pressure responsive device connected between said staff and said disk, a pinion meshing with said segment, and a spindle rigid with said pinion and having means accessible when said cover is open to turn said spindle, whereby said movable element can be calibrated with respect to said scale or chart.

10. In an instrument of the character stated, the combination of a casing, a scale or chart within said casing, a cover for said casing having a transparent portion through which said scale or chart is visible, a movable element having a part arranged in operative relation with said scale or chart, a rotatably mounted staff connected to said movable element, a disk pivotally mounted co-axially with respect to said staff and movable independently of said staff, said disk having a gear segment, a pressure responsive device connected between said staff and said disk, friction means normally holding said disk against movement, a pinion meshing with said segment, and a spindle rigid with said pinion and having means accessible when said cover is open to turn said spindle, whereby said movable element can be calibrated with respect to said scale or chart.

In witness whereof we have hereunto set our hands this 16 day of December, 1919.

RICHARD P. BROWN.
FRITZ WAGNER.